H. KORRODI & O. GRAUHERING.
SIGHT ATTACHMENT FOR GUNS.
APPLICATION FILED FEB. 19, 1908.

932,029.

Patented Aug. 24, 1909.
3 SHEETS—SHEET 1.

H. KORRODI & O. GRAUHERING.
SIGHT ATTACHMENT FOR GUNS.
APPLICATION FILED FEB. 19, 1908.
932,029.
Patented Aug. 24, 1909.
3 SHEETS—SHEET 2.
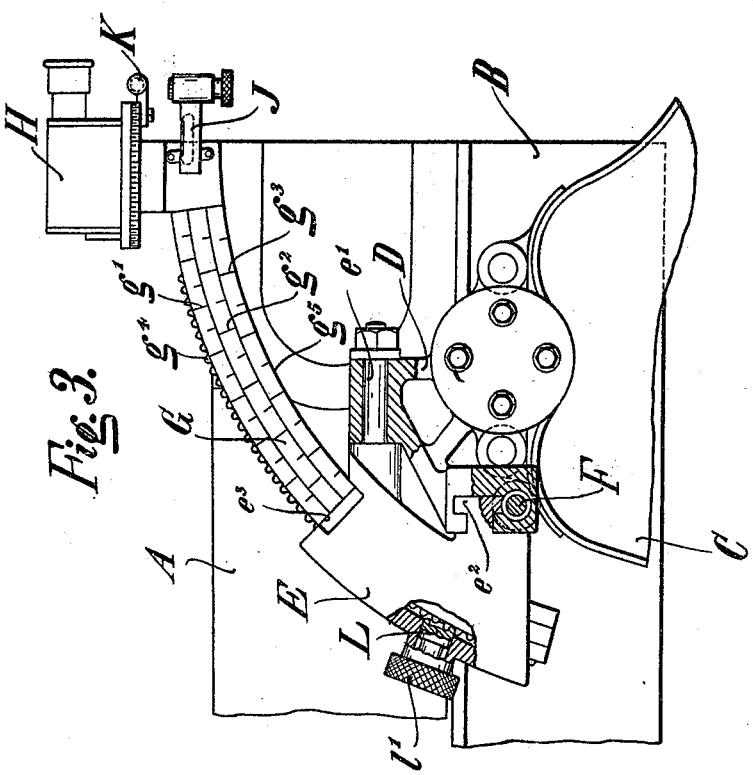
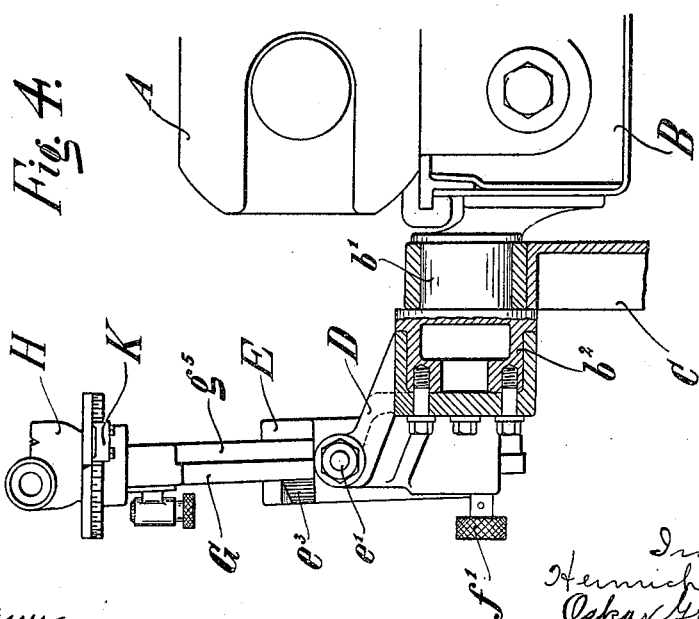

H. KORRODI & O. GRAUHERING.
SIGHT ATTACHMENT FOR GUNS.
APPLICATION FILED FEB. 19, 1908.

932,029.

Patented Aug. 24, 1909.
3 SHEETS—SHEET 3.

UNITED STATES PATENT OFFICE.

HEINRICH KORRODI AND OSKAR GRAUHERING, OF ESSEN-ON-THE-RUHR, GERMANY, ASSIGNORS TO FRIED. KRUPP AKTIENGESELLSCHAFT, OF ESSEN-ON-THE-RUHR, GERMANY.

SIGHT ATTACHMENT FOR GUNS.

932,029.  Specification of Letters Patent.  Patented Aug. 24, 1909.

Application filed February 19, 1908. Serial No. 416,719.

*To all whom it may concern:*

Be it known that we, HEINRICH KORRODI, residing at Essen-on-the-Ruhr, Germany, and OSKAR GRAUHERING, residing at Essen-on-the-Ruhr, Germany, both subjects of the Emperor of Germany, have invented a certain new and useful Improvement in Sight Attachments for Guns, of which the following is a specification.

The present invention relates to a sight-attachment for guns provided with a curved attachment-bar. The sight-attachment casing is located on that side of a plane passing through the axis of the horizontal trunnions and perpendicular to the axis of the bore, which is toward the muzzle. The hollow side of the attachment-bar is located toward the axis of the horizontal trunnions.

Figure 1:
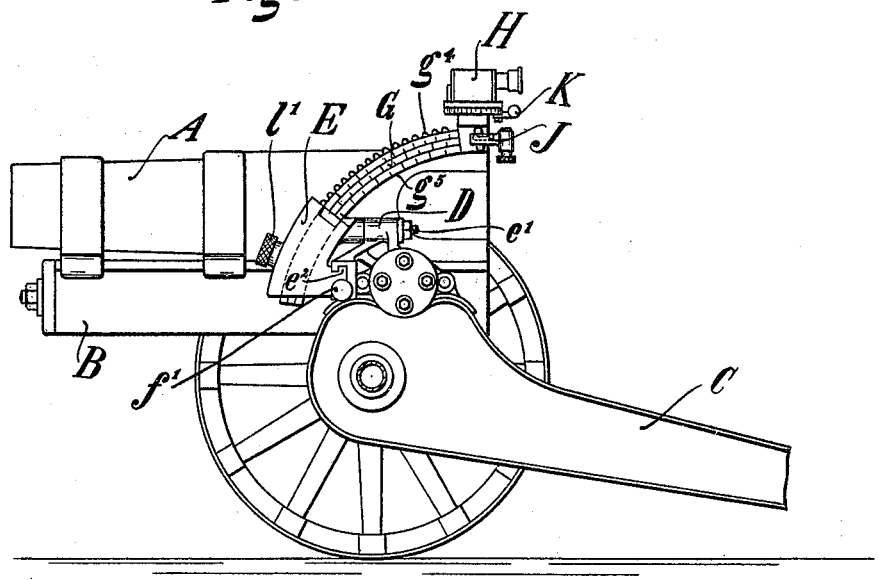
Figure 2:
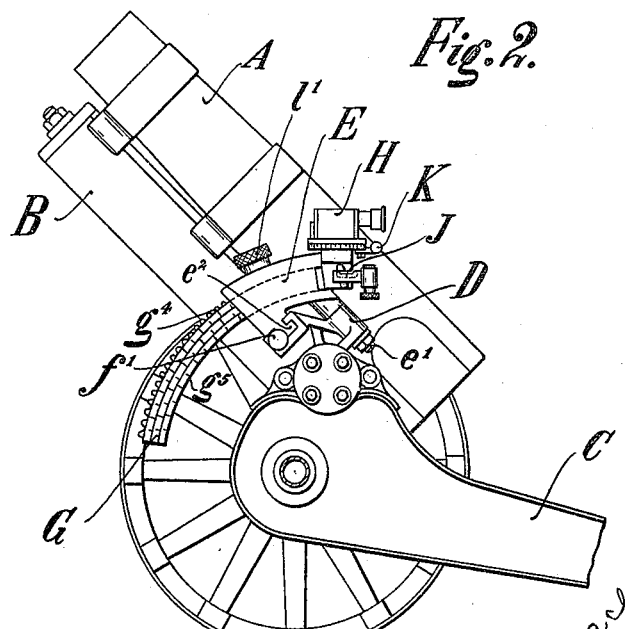
Figure 5:
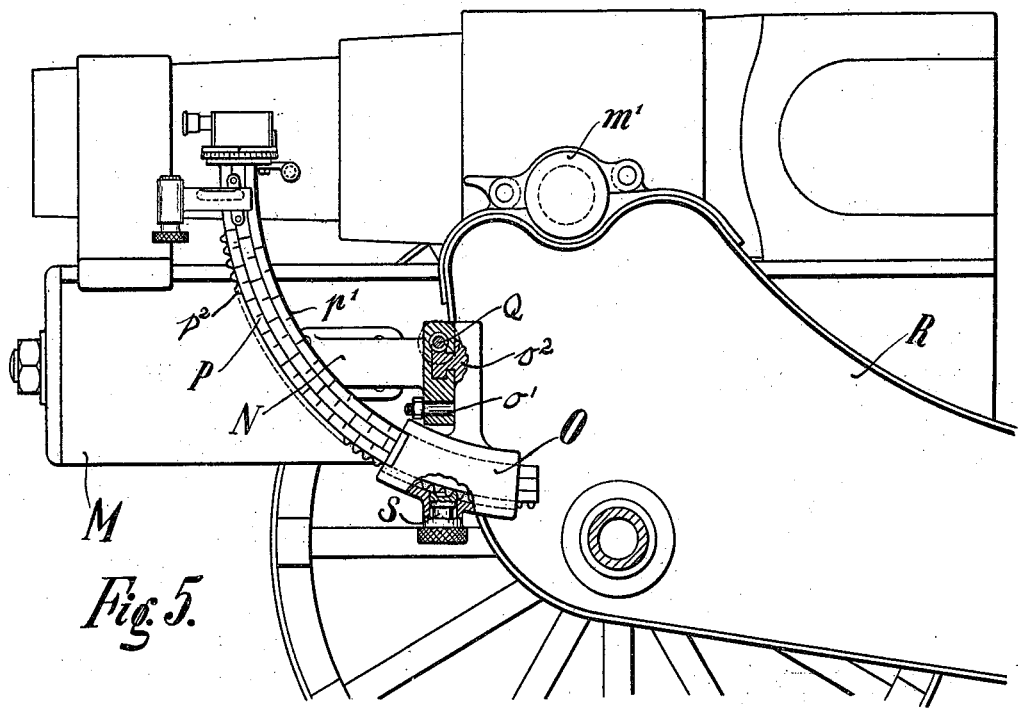
Figure 6:
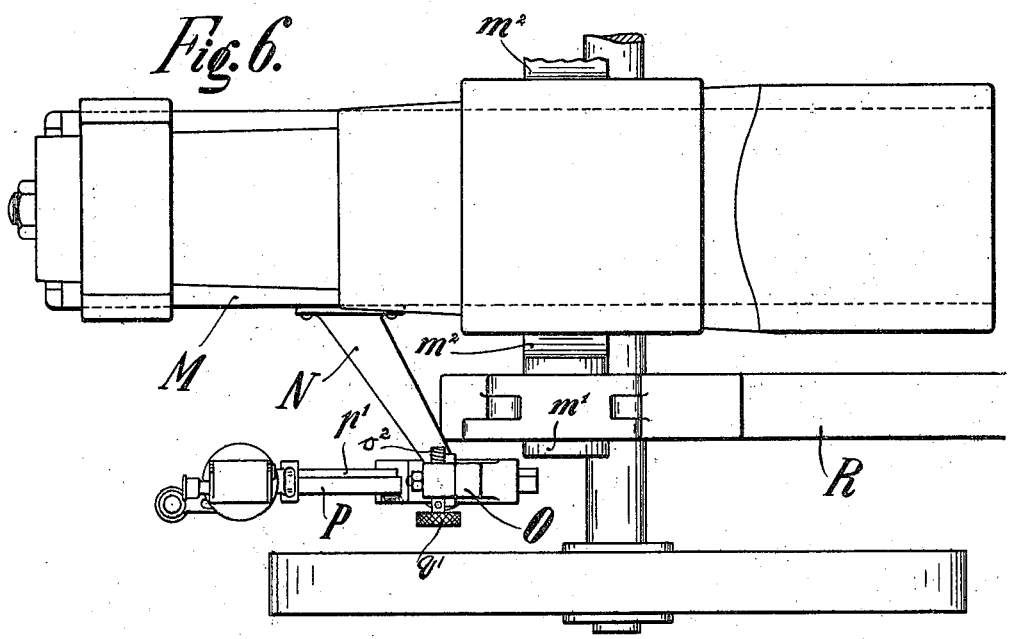

In the accompanying drawings, Figure 1 shows a side view of one embodiment of the invention and some parts of a high-elevation gun, the gun-barrel being in the horizontal position and the sight-attachment being in zero position; Fig. 2 is a view corresponding to Fig. 1 and showing the gun adjusted to a high elevation; Fig. 3 shows a part of Fig. 1 on an enlarged scale, some parts being shown in section; Fig. 4 is a rear view of Fig. 3, partly in section; Fig. 5 is a side view, partly in section, of another embodiment of the invention, the view corresponding to that shown in Fig. 1, and Fig. 6 is a top view of Fig. 5.

Reference will first be had to the embodiment shown in Figs. 1 to 4. The gun-barrel A is mounted to slide on the track-carrier B which by means of horizontal trunnions, of which the drawing (Fig. 4) shows only one ($b'$), is swingingly mounted in the mount C. The horizontal trunnions of the track-carrier are located in the proximity of the breech of the gun barrel. Between the mount and the track-carrier B is inserted an elevating mechanism, which is not shown in the drawings and which may be of any suitable construction.

One of the two horizontal trunnions, viz. $b'$, is provided with an extension $b^2$ (Fig. 4) which projects beyond the bearing for the trunnion and with which is rigidly connected an arm D which may be termed the sight-attachment carrier. The sight-attachment casing E is swingingly mounted in the carrier D through the medium of a trunnion $e'$ and a guide-rail $e^2$ which is curved concentrically to the axis of the trunnion $e'$. The axis of the trunnion $e'$ extends parallel to the axis of the bore of the gun barrel. The guide-rail $e^2$ is provided with teeth which mesh with a worm F (Fig. 3) journaled in the carrier D and having a hand-wheel $f'$. This swinging arrangement of the casing E, which is old, is for the purpose of making it possible to eliminate the influence of the inclined position of the wheels. The circularly curved attachment bar G which carries a sight-telescope H is slidably arranged in the attachment casing E. On that face of the attachment-bar, which is remote from the gun-barrel, elevation scales $g'$, $g^2$, $g^3$ (Fig. 3) are provided and the casing E has an edge $e^3$ to coöperate with these scales. A spiral gear L having a hand-wheel $l'$ and meshing with teeth $g^4$ on the attachment-bar is journaled in the casing E and serves for adjusting the sight-attachment to the desired elevation. The sight-attachment is provided with two levels J and K. The level J is adjustable in a known manner and serves to eliminate or measure the terrain-angle. The other level (K) is used when the influence of the inclined position of the wheels is eliminated.

The arrangement of the sight-attachment of the gun is selected in such a manner that the attachment-casing E lies on that side of a plane passing through the axis of the horizontal trunnions and perpendicular to the axis of the bore, which is toward the muzzle. Furthermore, the hollow side ($g^5$) of the attachment-bar G is toward the axis of the trunnions, as is customary in other sight-attachments.

It need not be explained in detail how the gun is directed. However, particular attention is drawn to the fact that when the sight-attachment is being adjusted to the desired elevation the attachment-bar G slides relatively to the attachment-casing E in such a manner that the sight-telescope H approaches the attachment-casing. For medium and greater elevations, on which high-elevation guns generally are fired, the center of gravity of the attachment-bar therefore lies either within the attachment-casing or in the direct proximity thereof. When the center of gravity of the attachment-bar is located in this manner vibration of the attachment-bar in the attachment-casing is, however, precluded to the greatest extent possible. Such vibrations, which the shocks on firing tend to produce, would increase the play between the attachment-bar and its guide, thus resulting in inaccuracies on directing the gun. Furthermore, the improved arrangement of the sight-attachment permits of the center of the curvature of the attachment-bar being located in the proximity of the axis of the horizontal trunnions or even in the axis, also in such guns which have their horizontal trunnions arranged in the proximity of the breech of the gun barrel. The sighting line has then the same or approximately the same elevation at all elevations of the gun barrel and it is therefore convenient to take aim at any adjustment of the sight-attachment. The improved arrangement of the sight-attachment also makes it possible to place the hand-wheel of the elevating mechanism and also the hand-wheel of the horizontal training mechanism, if any, in direct proximity of the sight-attachment, that is to say, in a convenient position for being operated by the gunner, viz. in the space behind the trunnion $b'$.

In the gun shown in Figs. 5 and 6 the horizontal trunnions $m'$ are located in the proximity of the center of gravity of the parts of the gun that swing about the horizontal trunnions, and the attachment carrier N is rigidly connected with the track carrier M. The attachment casing O is swingingly mounted at the free end of the attachment carrier N through the medium of a trunnion $o'$ and a rail $o^2$ which is curved toward the axis of the trunnion $o'$. The axis of the trunnion $o'$ extends parallel to the longitudinal axis of the bore of the gun barrel. The rail $o^2$ is provided with teeth which engage with a screw Q (Fig. 5) which is journaled in the attachment carrier N and is provided with a hand wheel $q'$ (Fig. 6). The swingable arrangement of the attachment casing serves the same purpose as in the embodiment shown in Figs. 1 to 4, viz. it makes it possible to eliminate the influence of the inclined position of the wheels. The attachment bar P is slidably guided in the attachment casing O. A spiral gear S, which meshes with teeth $p^2$ on the attachment bar, serves for adjusting the attachment to the desired elevation. The carrier N projects outwardly to such an extent that the attachment-casing O and the attachment-bar P are located on that side of one of the walls R of the mount that is remote from the track-carrier M. However, also in this embodiment the attachment-casing O is located on that side of a plane passing through the axis of the horizontal trunnions and perpendicular to the axis of the bore, which is toward the muzzle; the hollow side of the attachment-bar P is also in this embodiment toward the axis of the horizontal trunnions. This arrangement of securing the attachment-casing O to the gun mount R furthermore permits of the attachment-bar P being placed outside of the wall R of the mount and also in that type of guns wherein it is not feasible to secure the attachment-carrier on an extension of one of the trunnions. Hitherto it was necessary in such guns to arrange the attachment-bar between one of the walls of the mount and the track-carrier. This latter arrangement has the drawback that it is necessary to move the walls of the mount very far apart and thus increase the overall width of the piece which is a handicap in drill or in action.

The embodiment of the sight-attachment shown in Figs. 5 and 6 is especially adapted for use in the type of high elevation guns, such as heavy mortars, which are almost exclusively used in built up emplacements in which the outlook toward the front and side is cut off, the guns therefore being directed at the object by means of an auxiliary target located behind the gun-platform.

Having thus described the invention, what is claimed and desired to be secured by Letters Patent is:—

1. A gun provided with a sight-attachment comprising a curved attachment-bar, and a casing for said bar located on that side of a plane passing through the axis of the horizontal trunnions of the gun and perpendicular to the axis of the bore, which is toward the muzzle.

2. A gun provided with a sight-attachment comprising a curved attachment-bar having a hollow side located toward the axis of the horizontal trunnions, and a casing for said bar located on that side of a plane passing through the horizontal trunnions of the gun and perpendicular to the axis of the bore, which is toward the muzzle.

3. A gun provided with a curved sight-attachment bar and a casing for said bar located between the axis of the horizontal trunnions of the gun and the muzzle of the gun-barrel.

The foregoing specification signed at Dusseldorf, Germany, this 10th day of December, 1907.

HEINRICH KORRODI.
OSKAR GRAUHERING.

In presence of—
WILHELM FLASCHE,
PETER LIEBER.